Patented July 4, 1933

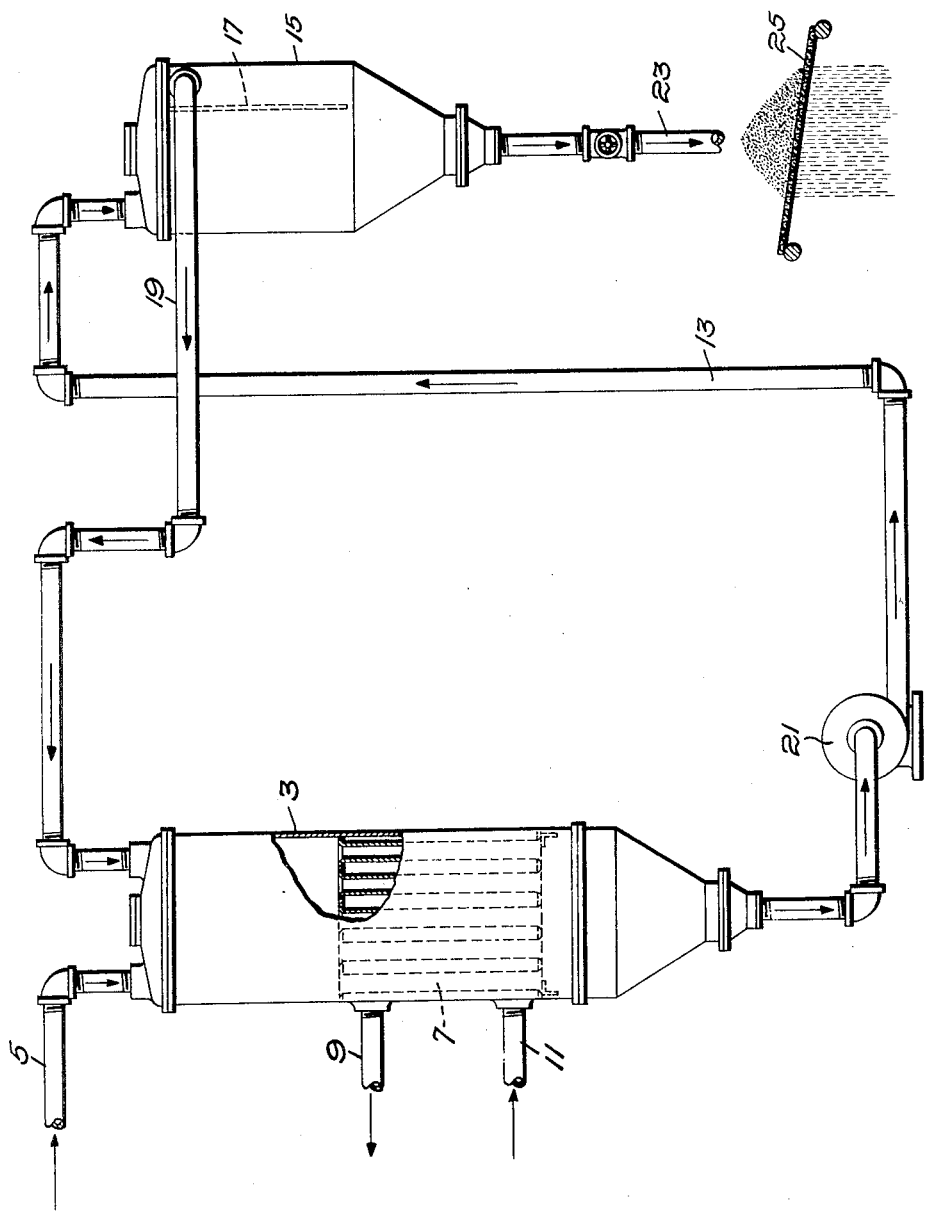

1,916,825

UNITED STATES PATENT OFFICE

KARL BURROUGHS, OF WATERTOWN, MASSACHUSETTS

SEPARATING SUBSTANCES FROM SOLUTIONS THEREOF

Application filed November 29, 1930. Serial No. 499,047.

This invention contemplates an improved process for separating a salt (that word being used in the generalized chemical sense) from a solution containing the same whereby precipitates may be formed and removed in a continuous manner efficiently and economically.

My invention will be well understood by reference to the following description taken in connection with the accompanying drawing, wherein I have shown a diagrammatic side elevation, partly broken away, of a mechanism by which my improved method may be practised.

Referring to the drawing, I have there shown a conically bottomed tank 3 to which the salt-containing solution may be supplied through a pipe 5 under suitable conditions of pressure. In the example of the invention illustrated the mechanism operates under atmospheric pressure and the solution simply flows in through pipe 5, preferably in a continuous stream throughout the operation of the mechanism. The tank 3 contains a suitable refrigerating mechanism, herein shown as a heat exchanger 7, which is preferably of the tubular belt or bundle type, and cooling fluid, which may be water if the process is carried out at a fairly high temperature, say 40° F., or refrigerated brine or other refrigerant in the case of lower temperatures, may be supplied through pipe 11 to circulate about the tubes and leave through pipe 9. The bottom of the tank is connected by a pipe 13 with the upper part of a suitable salt-separating device 15, which is shown as provided with a baffle 17 so that the effluent may be drawn away through pipe 19 after most of the solids have settled by gravity into the bottom of the separator and returned through that pipe to the tank 3 above the refrigerator 7. The tanks 3 and 15 and the connecting pipes 13 and 19 thus form a closed circuit in which is interposed a centrifugal pump 21 for circulating the liquid therethrough. This pump is capable of producing a sufficient velocity through the heat exchanger 7 to cause a markedly turbulent flow. Thus, for example, a velocity of the liquid of from four feet to perhaps twelve feet per second, while not demanding an excessive amount of power, will be sufficient in most cases to cause such a turbulence. Such turbulence, together with the precipitated salt, will scour the tubes, thus cleaning them so that the heat transfer will not fall off rapidly. At the same time this turbulent flow will reduce or eliminate the stagnant film of fluid along the walls of the tubes which will allow a much greater heat transfer than could be had with less rapid circulations. Such rapid circulation is especially desirable for solutions of a viscous nature as it increases the amount of heat removed per square foot of heat exchanger surface. This high velocity flow permits the use of a smaller size of apparatus for a definite amount of salt and heat removed. The linear velocity through the separator 15 is, of course, relatively greatly reduced due to the cross sectional areas involved and settling out of the salts is thus permitted.

When the circulating liquid has been sufficiently cooled, the material dissolved therein precipitates out and settles in the tank 15 from which it may be allowed continuously to escape through the outlet 23 in the bottom of the tank in the form of a slurry which may contain from 50 to 60 percent of solid material. This slurry may be de-watered on a filter, by a centrifugal machine or the like, and I have herein diagrammatically illustrated this step by the showing of a screen 25 on which material is being drained. Due to the withdrawal of a large quantity of liquid with the solids in this manner, the liquid which travels through the closed circuit is not constantly objectionably diluted with solvent from which the solids have been removed and a continuous supply of new solution may be maintained through pipe 5 and the slurry of solid matter withdrawn continuously.

The apparatus described will function under substantially fixed conditions under proper control of the temperatures of the entering solution and of the heat exchanger, the size of the settling chamber being fixed to provide therein a velocity of fluid low enough to permit settling while a high velocity occurs in the heat exchanger. If a salt solution of substantially constant composition is supplied at approximately fixed temperature, continuous operation with a steady rate of salt separation may be maintained.

Hitherto continuous processes of removing solid material from their solutions have been practised in evaporating apparatus operating under relatively high temperatures and/or vacuum. The advantages of this process as contrasted with these evaporating processes will be obvious. I am aware that the separation of solids from their solutions has also been effected in an intermittent manner by cooling and crystallizing in pans or other vessels. In some instances, as, for instance, in the mechanism proposed in the patent to Miles 633,206, Sept. 19, 1899, the filtrate withdrawn from the solids precipitated by cooling has been returned to the process with the idea of agitating the mixture and facilitating the cooling action. Such return, however, is incidental to a process contemplating the commercially complete precipitation of the solid material and the discarding of the exhausted solvent. As contrasted with such a process I provide a continuous process in which the solution may be supplied continuously and the precipitated material continuously withdrawn while intervening between these initial and final operations a vigorous circulation of the material in the closed circuit effects efficient heat transfer.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A method of recovering a salt from a solution containing the same which comprises establishing a continuous supply of the liquid at a rapid rate to a zone of refrigeration to effect precipitation of salt in said zone, withdrawing the precipitated salt with the stream of liquid, checking the velocity of the stream to permit substantial separation of the precipitate and redirecting the supernatant liquor to return to the zone of refrigeration to complete a closed, continuously flowing system.

2. A method of recovering a salt from a solution containing the same which comprises establishing a continuous supply of the liquid at a rapid rate to a zone of refrigeration to effect precipitation of salt in said zone, withdrawing the precipitated salt with the stream of liquid, checking the velocity of the stream to permit substantial separation of the precipitate, withdrawing substantially continuously a slurry of precipitated salts and redirecting the supernatant liquor to return to the zone of refrigeration to complete a closed, continuously flowing system.

3. A method of recovering a salt from a solution containing the same which comprises establishing a continuous supply of the liquid to a multiplicity of small passages in which it is refrigerated at a rate of several feet per second effective to produce a scouring turbulence in the passages.

4. A process for precipitating and continuously removing a soluble salt from solution which comprises circulating the solution at relatively high linear velocity through a chamber in which heat is controllably extracted from said solution, thereby effecting partial precipitation in turbulent suspension of said salt; thence continuing at relatively low linear velocity through a chamber in which the precipitated salt settles out of suspension to the bottom and, together with a sufficient amount of solution to effect mobility, flow out of said chamber, the mother liquor continuing out of the top of said chamber back to the first chamber; fresh solution being continuously added in sufficient quantity to make up for the salt and adhering water discharged, the temperature of the heat extracting member being so coordinated to the rate of circulating flow and to the temperature and composition of the inflowing solution as to prescribe a substantially constant rate of salt output.

In testimony whereof, I have signed my name to this specification.

KARL BURROUGHS.